US011753075B2

(12) United States Patent
Nishioka et al.

(10) Patent No.: US 11,753,075 B2
(45) Date of Patent: Sep. 12, 2023

(54) CALIBRATION METHOD FOR ROTATION ANGLE CALCULATION DEVICE, CALIBRATION DEVICE FOR ROTATION ANGLE CALCULATION DEVICE, ROTATION ANGLE CALCULATION DEVICE, MOTOR CONTROL DEVICE, ELECTRIC ACTUATOR PRODUCT, AND ELECTRIC POWER

(71) Applicant: NSK LTD., Tokyo (JP)

(72) Inventors: Yusuke Nishioka, Maebashi (JP); Yoshihiro Aosaki, Fujisawa (JP); Hiroyuki Yamamura, Tokyo (JP)

(73) Assignee: NSK LTD., Tokyo (JP)

( * ) Notice: Subject to any disclaimer, the term of this patent is extended or adjusted under 35 U.S.C. 154(b) by 48 days.

(21) Appl. No.: 17/670,925

(22) Filed: Feb. 14, 2022

(65) Prior Publication Data

US 2022/0161851 A1  May 26, 2022

Related U.S. Application Data

(62) Division of application No. 17/299,921, filed as application No. PCT/JP2020/047011 on Dec. 16, 2020, now Pat. No. 11,292,519.

(30) Foreign Application Priority Data

Jan. 31, 2020  (JP) ................................. 2020-015125

(51) Int. Cl.
*B62D 15/02* (2006.01)
*B62D 5/04* (2006.01)
(Continued)

(52) U.S. Cl.
CPC ....... *B62D 15/0235* (2013.01); *B62D 5/0463* (2013.01); *G01D 5/16* (2013.01); *G01D 18/00* (2013.01)

(58) Field of Classification Search
CPC .............. B62D 15/0235; B62D 5/0463; B62D 5/0457; G01D 5/16; G01D 18/00;
(Continued)

(56) References Cited

U.S. PATENT DOCUMENTS 6,639,529 B1   10/2003  Jansson
2003/0135314 A1 *  7/2003  Saito .................... G01D 11/245
701/69

(Continued)

FOREIGN PATENT DOCUMENTS

JP       2011247747 A    12/2011
JP       2014-210472 A   11/2014
(Continued)

OTHER PUBLICATIONS

International search report for PCT/JP2020/047011 dated Feb. 9, 2021.

(Continued)

*Primary Examiner* — Behrang Badii
(74) *Attorney, Agent, or Firm* — Sughrue Mion, PLLC

(57) ABSTRACT

A calibration method in which, a rotation angle calculation device (20, 30) calculates (S2) a rotation angle θc based on a detection signal of a sensor, transmits (S3) rotation angle data Dc indicating the rotation angle θc to a calibration device (40), and transmits (S3) time difference data Dt relating to a time difference after having captured the detection signal until transmitting the rotation angle data to the calibration device, and in which the calibration device measures (S1) a rotation angle θr, clocks (S1, S4) a measurement time tm at which the rotation angle θr is measured and a transmission time tt of transmitting or receiving the rotation angle data, and acquires (S5, S6) calibration data Dc of the rotation angle data by comparing the rotation angle θr measured at a time tc2 obtained by going back in time from (Continued)

the transmission time tt by the time difference after having captured the detection signal until transmitting the rotation angle data and the rotation angle data Da with each other.

4 Claims, 9 Drawing Sheets

(51) Int. Cl.
  *G01D 5/16* (2006.01)
  *G01D 18/00* (2006.01)

(58) Field of Classification Search
  CPC ........ G01D 18/001; G01D 5/145; G01B 7/30; H02P 23/14; H02P 2203/05
  See application file for complete search history.

(56) References Cited

U.S. PATENT DOCUMENTS

| | | |
|---|---|---|
| 2011/0115477 A1 | 5/2011 | Suzuki |
| 2011/0137609 A1* | 6/2011 | Itomi ................... G01D 18/008 |
| | | 324/207.25 |
| 2014/0347040 A1* | 11/2014 | Kawase ............... G01D 5/2448 |
| | | 324/207.12 |
| 2015/0035520 A1* | 2/2015 | Roesner ............... G01D 18/008 |
| | | 324/207.25 |
| 2015/0059432 A1 | 3/2015 | Zhuge et al. |
| 2015/0208041 A1 | 7/2015 | Wang et al. |
| 2016/0018243 A1* | 1/2016 | Okon ................... G01C 25/005 |
| | | 73/1.77 |
| 2016/0207562 A1* | 7/2016 | Jang ....................... B62D 5/046 |
| 2021/0111055 A1 | 4/2021 | Tamatsukuri et al. |
| 2021/0280969 A1* | 9/2021 | Fang ........................ H01Q 3/04 |

FOREIGN PATENT DOCUMENTS

| | | |
|---|---|---|
| JP | 2018-185198 A | 11/2018 |
| JP | 2019-039704 A | 3/2019 |

OTHER PUBLICATIONS

Written opinion forPCT/JP2020/047011 dated Feb. 9, 2021.
Office Action dated Jan. 11, 2022 in European Application No. 20891414.3.
Supplementary European Search Report dated Dec. 20, 2021 in European Application No. 5. 20891414.3.
International Preliminary Report on Patentability dated Jul. 28, 2022 in International Application No. PCT/JP2020/047011.

* cited by examiner

| STATUS | TIME DIFFERENCE DATA Dt | ROTATION ANGLE DATA Da |

CALIBRATION METHOD FOR ROTATION ANGLE CALCULATION DEVICE, CALIBRATION DEVICE FOR ROTATION ANGLE CALCULATION DEVICE, ROTATION ANGLE CALCULATION DEVICE, MOTOR CONTROL DEVICE, ELECTRIC ACTUATOR PRODUCT, AND ELECTRIC POWER

CROSS-REFERENCE TO RELATED APPLICATIONS

This application is a divisional application of U.S. application Ser. No. 17/299,921 filed Jun. 4, 2021, which is a National Stage of International Application No. PCT/JP2020/047011 filed Dec. 16, 2020, which claims priority under U.S.C. § 119(a) to Japanese Patent Application No. JP2020-015125 filed on Jan. 31, 2020, the contents of all of which are incorporated herein by reference in their entirety.

TECHNICAL FIELD

The present invention relates to a calibration method for a rotation angle calculation device, a calibration device for a rotation angle calculation device, a rotation angle calculation device, a motor control device, an electric actuator product, and an electric power steering device.

BACKGROUND ART

Rotation angle calculation devices that calculate a rotation angle of a rotating body, based on a detection signal output from a sensor according to rotation of the rotating body have been known. For example, in PTL 1 described below, an angle detection device including a sensor unit that detects a rotation angle of a rotating body and outputs a sin signal and a cos signal is disclosed.

When using such a rotation angle calculation device, it is preferable to calibrate the rotation angle calculation device by comparing a rotation angle calculated from output signals from the sensor and measurement data of a rotation angle of the rotating body that were separately measured with each other.

As a technology for comparing detection signals acquired from different sensors with each other, an invention described in PTL 2 described below has been known. In PTL 2, a time stamp assignment unit configured to assign a time stamp ATi to a detection signal Ai from a sensor A and assign a time stamp BTj to a detection signal Bj from a sensor B, a synchronous signal search unit configured to search a storage unit for a detection signal Bj that is best synchronized with the detection signal Ai, based on the time stamps ATi and BTi, and a vernier calculation means configured to perform calculation and vernier calculation of an angular difference between synchronous signals searched for by the synchronous signal search unit are described.

CITATION LIST

Patent Literature

PTL 1: JP 2018-185198 A
PTL 2: JP 2014-210472 A

SUMMARY OF INVENTION

Technical Problem

When the rotation angle calculation device is calibrated using measurement data measured by an external measurement device separate from the rotation angle calculation device, it is required to secure synchronization between a rotation angle calculated by the rotation angle calculation device and measurement data measured by the external measurement device.

When synchronization is to be secured by comparison between time stamps as in PTL 2 described above, it is not possible to secure synchronization between a rotation angle calculated by the rotation angle calculation device and measurement data measured by the external measurement device unless a clocking means in the rotation angle calculation device and a clocking means in the external measurement device are synchronous with each other.

The present invention has been made in consideration of the above-described problems, and an object of the present invention is to generate calibration data fora rotation angle calculation device by securing synchronization between a rotation angle calculated by the rotation angle calculation device and a rotation angle measured by an external measurement device separate from the rotation angle calculation device.

Solution to Problem

According to an aspect of the present invention, there is provided a calibration method for a rotation angle calculation device configured to calculate a rotation angle of a rotating body, based on a detection signal output from a sensor depending on rotation of the rotating body, the method including: the rotation angle calculation device calculating a rotation angle of the rotating body, based on the detection signal; transmitting rotation angle data indicating the rotation angle from the rotation angle calculation device to a calibration device; transmitting time difference data relating to a time difference after having captured the detection signal from the sensor until transmitting the rotation angle data from the rotation angle calculation device to the calibration device; the calibration device measuring a rotation angle of the rotating body; clocking a measurement time at which the calibration device measures a rotation angle of the rotating body and a transmission time at which the rotation angle data are transmitted or received, using the calibration device; and acquiring calibration data of the rotation angle data by comparing a rotation angle of the rotating body measured by the calibration device at a time obtained by going back in time from the transmission time by the time difference and the rotation angle data with each other.

According to another aspect of the present invention, there is provided a calibration device for a rotation angle calculation device configured to calculate a rotation angle of a rotating body, based on a detection signal output from a sensor depending on rotation of the rotating body, including: a reception unit configured to receive, from the rotation angle calculation device, rotation angle data indicating a rotation angle of the rotating body calculated based on the detection signal and time difference data relating to a time difference after the rotation angle calculation device having captured the detection signal from the sensor until transmitting the rotation angle data; a rotation angle measurement unit configured to measure a rotation angle of the rotating body; a clocking unit configured to clock a measurement time at which the rotation angle measurement unit measures a rotation angle of the rotating body and a transmission time at which the rotation angle data are transmitted or received; and a calibration data generation unit configured to generate calibration data of the rotation angle data by comparing a rotation angle of the rotating body measured by the rotation angle measurement unit at a time obtained by going back in time from the transmission time by the time difference and the rotation angle data with each other.

According to still another aspect of the present invention, there is provided a rotation angle calculation device including: a sensor configured to output a detection signal depending on rotation of a rotating body; a rotation angle calculation unit configured to calculate a rotation angle of the rotating body, based on the detection signal; a reception unit configured to receive calibration data for calibration of a rotation angle of the rotating body calculated by the rotation angle calculation unit; a storage unit configured to store the received calibration data; a correction unit configured to correct a rotation angle of the rotating body calculated by the rotation angle calculation unit with the calibration data stored in the storage unit; and a transmission unit configured to transmit rotation angle data indicating the rotation angle calculated by the rotation angle calculation unit and not corrected by the correction unit and to also transmit time difference data relating to a time difference after having captured the detection signal from the sensor until transmitting the rotation angle data.

According to yet another aspect of the present invention, there is provided a motor control device including: the rotation angle calculation device described above configured to calculate a rotation angle of a rotation shaft of a motor as the rotating body; and a driving unit configured to drive the motor according to a rotation angle of the rotating shaft corrected by the correction unit.

According to a further aspect of the present invention, there is provided an electric actuator product including: the motor control device described above; and a motor controlled by the motor control device.

According to a still further aspect of the present invention, there is provided an electric power steering device including: the motor control device described above; and a motor controlled by the motor control device, wherein a steering assist force is provided to a steering system of a vehicle by the motor.

Advantageous Effects of Invention

According to the present invention, it is possible to generate calibration data for a rotation angle calculation device by securing synchronization between a rotation angle calculated by the rotation angle calculation device and a rotation angle measured by an external measurement device separate from the rotation angle calculation device.

DESCRIPTION OF EMBODIMENTS

Embodiments of the present invention will be described in detail with reference to the drawings. Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

(Configuration)

Figure 1:
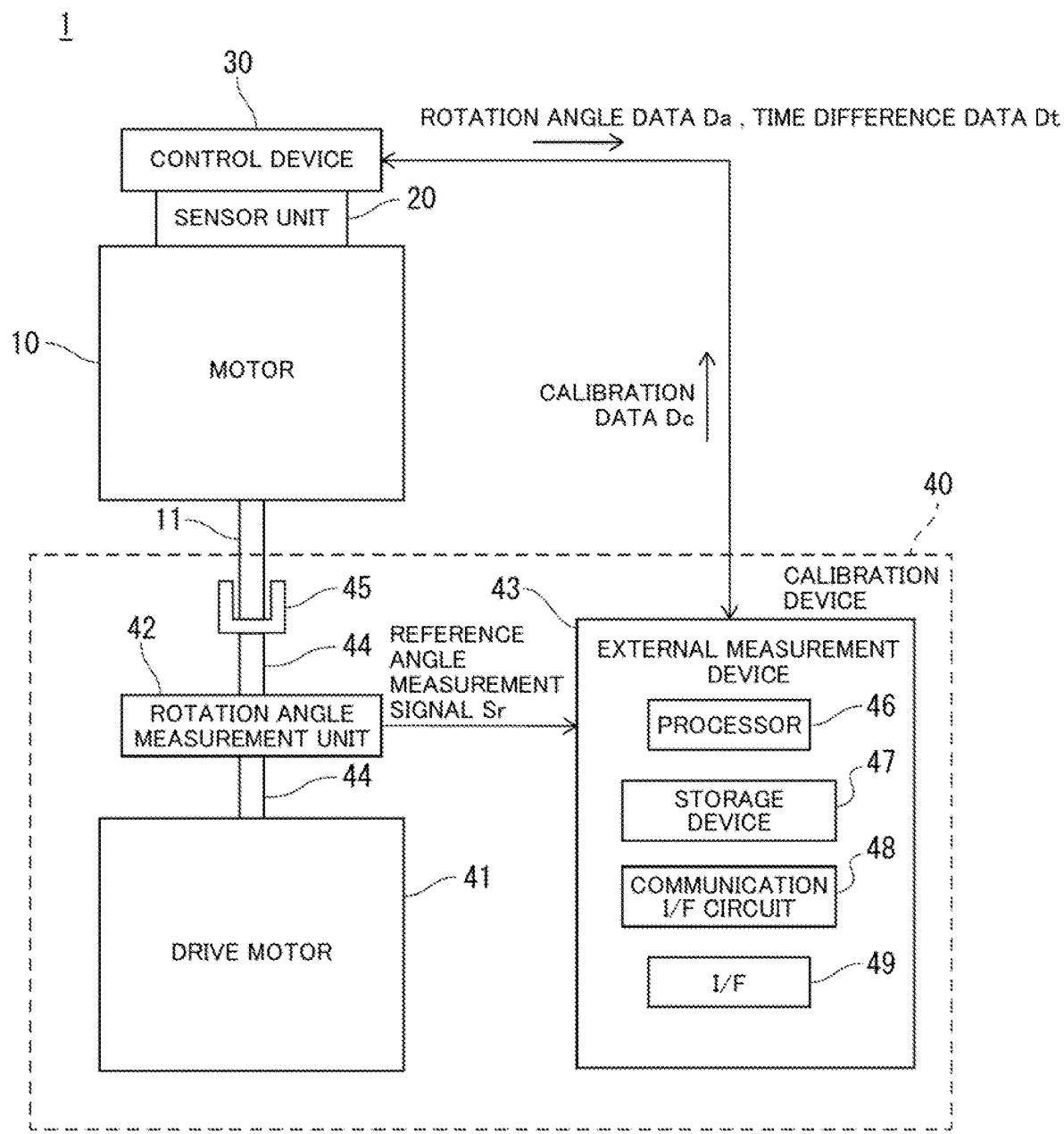
FIG. 1 is a schematic configuration diagram of an example of a calibration system for a rotation angle calculation device of an embodiment.

FIG. 1 is now referred to. A calibration system 1 of this embodiment calibrates a rotation angle calculation device configured to calculate a rotation angle of a rotation shaft 11 of a motor 10, the rotation shaft 11 being a rotating body. Note that the target of the present invention is not limited to the rotation angle calculation device configured to calculate a rotation angle of the rotation shaft 11 of the motor 10. The present invention is applicable to rotation angle calculation devices configured to calculate rotation angles of a variety of rotating bodies.

The calibration system 1 includes a rotation angle calculation device that is calibrated by the calibration system 1 and a calibration device 40. The rotation angle calculation device includes a sensor unit 20 and a control device 30.

Figure 2:
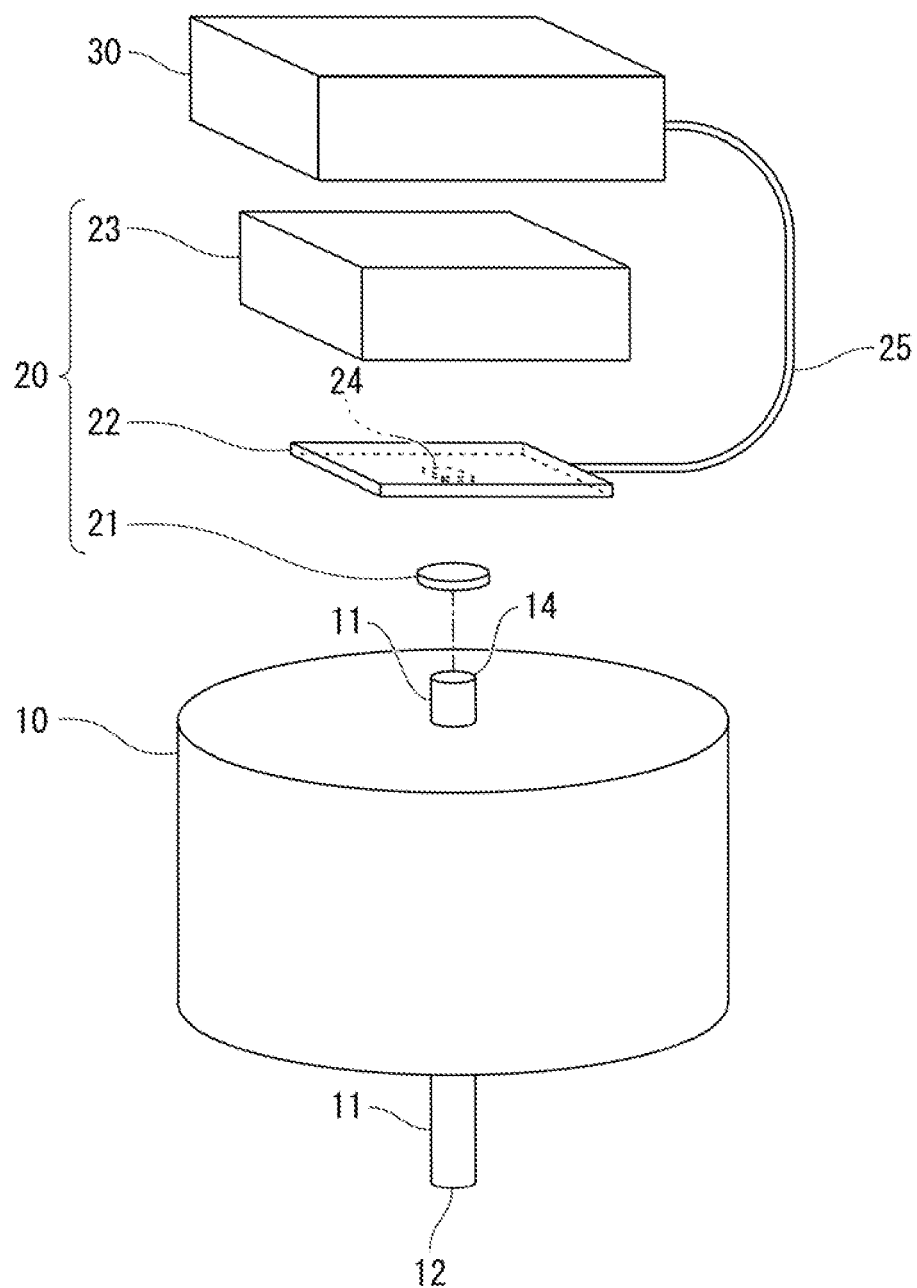
FIG. 2 is an exploded view illustrative of an overview of an example of the rotation angle calculation device of the embodiment.

The sensor unit 20 outputs a detection signal depending on rotation of the rotation shaft 11 to the control device 30. FIG. 2 is now referred to. The sensor unit 20 includes a magnet 21, a circuit board 22, and a support member 23.

The magnet 21 is fixed to an end 14 of the rotation shaft 11 of the motor 10 on the opposite side to an output end 12 thereof and has different magnetic poles (S-poles and N-poles) arranged along the circumferential direction of the rotation shaft 11.

On the circuit board 22, a magnetic resistance (MR) sensor element (integrated circuit) 24 is mounted. A redundant system, with a plurality of MR sensor elements mounted on the circuit board 22, configured to separately calculate a rotation angle of the rotation shaft 11, based on detection signals from each of the MR sensor elements may be configured.

The circuit board 22 is fixed to the support member 23 by means of a not-illustrated fixing means, such as a fastening screw and caulking. In addition, the support member 23 is similarly fixed to the motor 10 by means of a not-illustrated fixing means.

A position at which the circuit board 22 is fixed to the support member 23 and a position at which the support member 23 is fixed to the motor 10 are determined in such a way that, when the circuit board 22 is fixed to the support member 23 and the support member 23 is fixed to the motor 10, the circuit board 22 is arranged between the support member 23 and the motor 10 and the MR sensor element 24 comes close to the magnet 21.

This configuration causes the MR sensor element 24 to, when the magnet 21 rotates in association with the rotation of the rotation shaft 11 of the motor 10, detect a change in magnetic flux of the magnet 21 depending on a rotation angle and output a detection signal depending on the rotation of the rotation shaft 11 of the motor 10.

For example, the MR sensor element 24 outputs a sine signal $\sin\theta m$ and a cosine signal $\cos\theta m$ depending on a rotation angle $\theta m$ of the rotation shaft 11 of the motor 10 as detection signals depending on the rotation of the rotation shaft 11 of the motor 10.

Note that the sensor that the rotation angle calculation device of the present invention uses is not limited to an MR sensor. The rotation angle calculation device of the present invention may detect a rotation angle $\theta m$ of the rotation shaft 11 of the motor 10 by means of a sensor using another type other than an MR sensor.

The support member 23 is, for example, a cover that covers the circuit board 22. The support member 23, for example, has a recessed portion that opens downward in FIG. 1, and the circuit board 22 is fixed inside the recessed portion of the support member 23. When the support member 23 is fixed to the motor 10, an opening portion of the recessed portion of the support member 23 is shielded by the motor 10 and the circuit board 22 is housed inside an internal space that is defined by the recessed portion of the support member 23 and the motor 10. This configuration causes the circuit board 22 to be protected from impact or foreign objects from the outside.

The support member 23 may be formed of a metal having excellent thermal conductivity, such as an aluminum alloy, and may act as a heat sink. The support member 23 may be a heat sink itself.

The control device 30, which is an electronic control unit (ECU) that is a separate entity from the sensor unit 20, is connected to the sensor unit 20 by means of a harness 25. Detection signals output from the MR sensor element 24 according to the rotation of the rotation shaft 11 of the motor 10 are transmitted to the control device 30 via the harness 25.

The control device 30 calculates a rotation angle $\theta m$ of the rotation shaft 11 of the motor 10, based on the detection signals detected by the MR sensor element 24 and controls a power semiconductor switching element according to the calculated rotation angle $\theta m$ to drive the motor 10.

Figure 3:
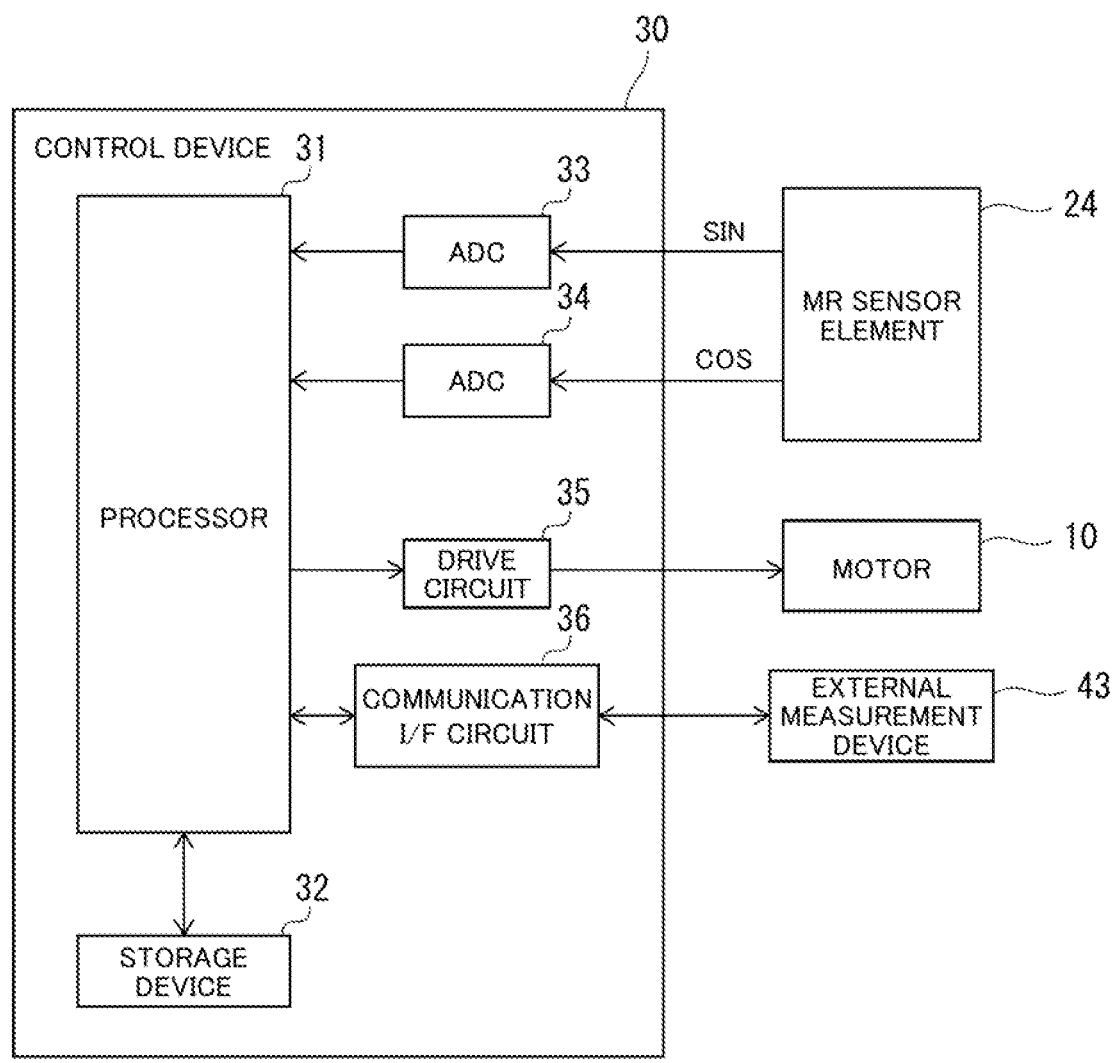
FIG. 3 is a schematic configuration diagram of the rotation angle calculation device of the embodiment.

FIG. 3 is now referred to. The control device 30 includes a processor 31, such as a central processing unit (CPU) or a micro-processing unit (MPU), a storage device 32 that is a memory or the like, an analog-digital converters (ADCs) 33 and 34, a drive circuit 35, and a communication interface (I/F) circuit 36.

Functions of the control device 30 that will be described below are achieved by, for example, the processor 31 executing computer programs stored in the storage device 32.

The control device 30 may be formed using dedicated hardware for performing respective parts of information processing, which will be described below, in addition to or in place of the processor 31.

For example, the control device 30 may include functional logic circuits that are set in a general-purpose semiconductor integrated circuit. For example, the control device 30 may have a programmable logic device (PLD), such as a field programmable gate array (FPGA), or the like.

As described above, the MR sensor element 24 detects a change in magnetic flux of the magnet 21, which rotates in conjunction with the rotation shaft 11 of the motor 10, and thereby outputs a sine signal $SIN=\sin\theta m$ and a cosine signal $COS=\cos\theta m$ depending on a rotation angle $\theta m$ of the rotation shaft 11 of the motor 10.

The control device 30 reads a sine signal SIN and a cosine signal COS converted to digital signals by the ADC 33 and the ADC 34.

The control device 30 calculates a detected angle $\theta c$ of the rotation angle of the rotation shaft 11 of the motor 10, based on the sine signal SIN and the cosine signal COS. The detected angle $\theta c$ is a value that is theoretically calculated based on the sine signal SIN and the cosine signal COS and is a theoretical value before calibration.

The control device 30 receives calibration data Dc for calibrating the detected angle $\theta c$ from an external measurement device 43 in the calibration device 40 illustrated in FIG. 1 via the communication I/F circuit 36.

The control device 30, by correcting the detected angle $\theta c$, which is calculated based on the sine signal SIN and the cosine signal COS, based on the calibration data Dc, which is received from the external measurement device 43, calculates a rotation angle $\theta m$ of the rotation shaft 11 of the motor 10.

The control device 30 controls the drive circuit 35 (such as an inverter) according to the calculated rotation angle $\theta m$ to drive the motor 10.

Figure 4:
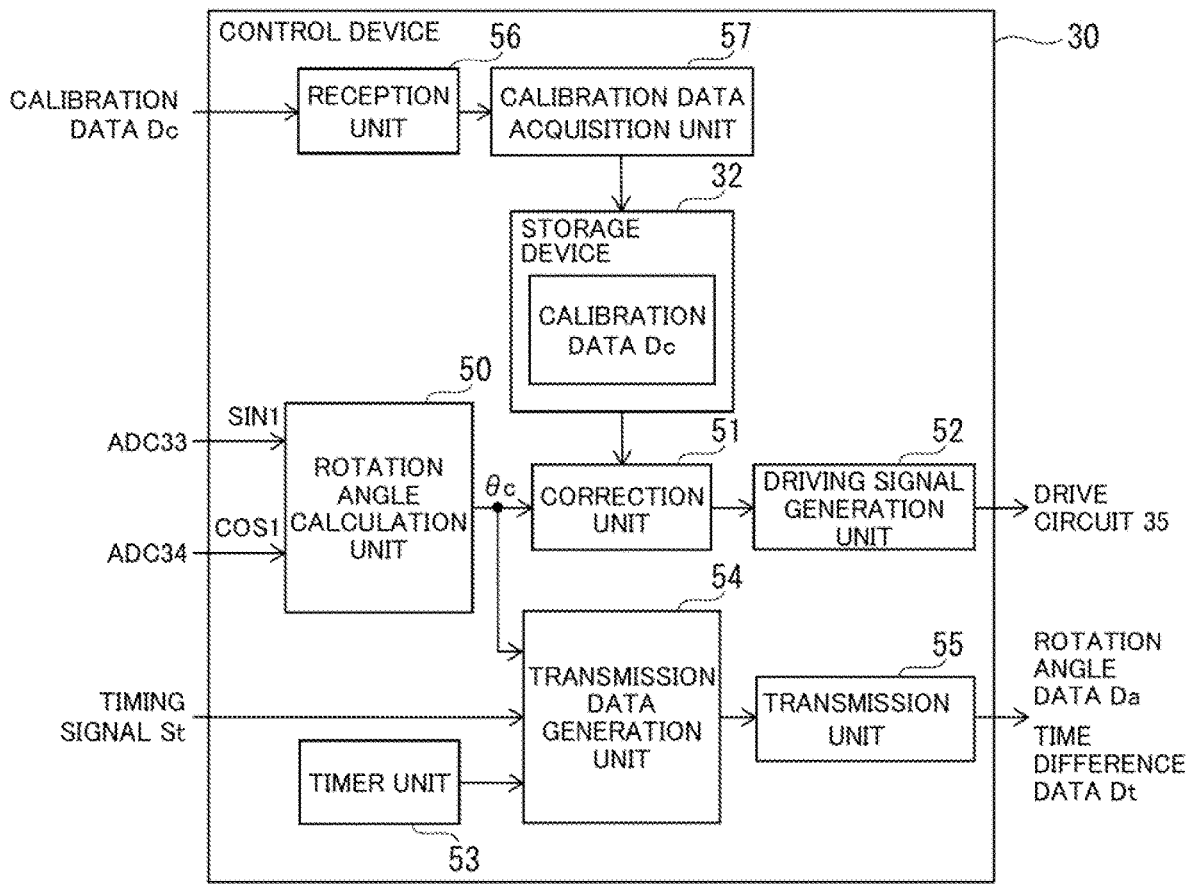
FIG. 4 is an explanatory diagram of an example of a functional configuration of a control device in FIG. 3.

With reference to FIG. 4, an example of a functional configuration of the control device 30 will be described.

The control device 30 includes a rotation angle calculation unit 50, a correction unit 51, a driving signal generation unit 52, a clocking unit 53, a transmission data generation unit 54, a transmission unit 55, a reception unit 56, and a calibration data acquisition unit 57.

The rotation angle calculation unit 50 calculates a detected angle $\theta c$ of the rotation angle of the rotation shaft 11 of the motor 10, based on a sine signal SIN and a cosine signal COS converted to digital signals by the ADC 33 and the ADC 34.

Figure 5:
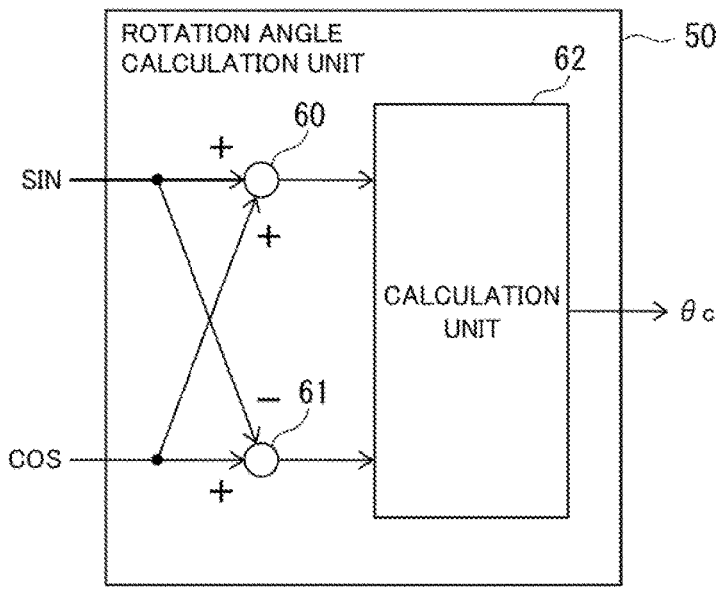
FIG. 5 is an explanatory diagram of an example of a functional configuration of a rotation angle calculation unit in FIG. 4.

FIG. 5 is now referred to. The rotation angle calculation unit 50 includes an adder 60, a subtracter 61, and a calculation unit 62.

The calculation unit 62 calculates a detected angle $\theta c$, based on an output (COS+SIN) of the adder 60 and an output (COS−SIN) of the subtracter 61.

FIG. 4 is now referred to. The correction unit 51 reads calibration data Dc stored in the storage device 32, corrects the detected angle $\theta c$, based on the calibration data Dc, and thereby acquires a rotation angle $\theta m$ of the rotation shaft 11 of the motor 10.

The calibration data Dc are data for correcting error (so-called linearity error) between an actual rotation angle $\theta m$ that is a detection target and the detected angle $\theta c$.

Figures 6, 7:
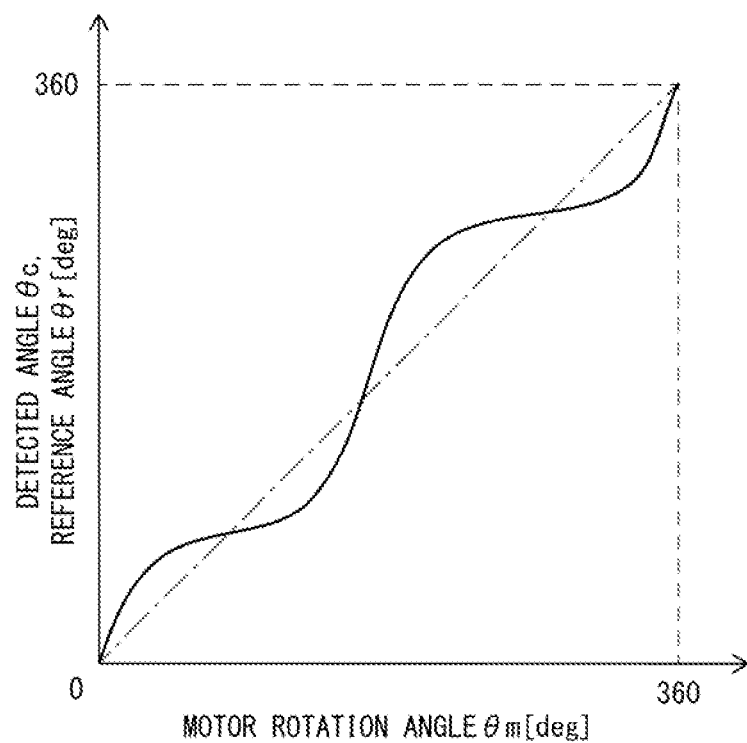
FIG. 6 is an explanatory diagram of an example of calibration data.
FIG. 7 is an explanatory diagram of an example of a format of transmission data that a transmission data generation unit in FIG. 4 generates.

FIG. 6 is now referred to. The abscissa represents the actual rotation angle $\theta m$ of the rotation shaft 11 of the motor 10, and the ordinate represents a reference angle $\theta r$ (alternate long and short dash line) that serves as a reference when calibrating the detected angle $\theta c$ and the detected angle $\theta c$ (solid line). The reference angle $\theta r$ ideally coincides with the actual rotation angle $\theta m$.

The calibration data Dc are, for example, data that are made by storing differences (θc-θr) between detected angles θc and reference angles θr in the storage device 32 in association with the detected angles θc.

FIG. 4 is now referred to. The correction unit 51 calculates a corrected rotation angle θr=θm by reading calibration data Dc=(θc-θr) from the storage device 32, which are stored in association with the detected angle θc, and subtracting the calibration data Dc from the detected angle θc.

The driving signal generation unit 52 generates a driving signal that controls the drive circuit 35, based on the corrected rotation angle θm, and outputs the generated driving signal to the drive circuit 35. For example, the driving signal generation unit 52 outputs a gate signal that turns on and off a switching element installed in the drive circuit 35.

With the above-described configuration, the control device 30 drives the motor 10 according to the rotation angle θm of the rotation shaft 11 of the motor 10.

The control device 30 has a mode of driving the motor 10 (hereinafter, referred to as "motor drive mode") by causing the rotation angle calculation unit 50, the correction unit 51, and the driving signal generation unit 52 to operate as described above as one of the operation modes of the control device 30.

On the other hand, the control device 30 has, in addition to the motor drive mode, a mode of outputting data (hereinafter, referred to as "data output mode") that indicate a detected angle θc that was calculated by the rotation angle calculation unit 50 and has not been corrected yet by the correction unit 51 as another operation mode of the control device 30.

The data indicating the detected angle θc (hereinafter, sometimes referred to as "rotation angle data Da"), which are output in the data output mode, can be used for the calibration device 40, which is external to the control device 30, to generate calibration data Dc.

In the data output mode, the rotation angle calculation unit 50, the clocking unit 53, the transmission data generation unit 54, and the transmission unit 55 operate.

The clocking unit 53 clocks time. For example, the clocking unit 53 may clock an elapsed period from a predetermined point of time (for example, a point of time at which the operation mode of the control device 30 is switched to the data output mode) as time or may clock the current time while constantly operating.

The transmission data generation unit 54 receives a timing signal St that indicates a timing at which the control device 30 captured detection signals (a sine signal SIN and a cosine signal COS) from the MR sensor element 24.

For example, the timing signal St may be a signal indicating sample/hold timing of the ADC 33 and the ADC 34. When a conversion period for converting analog signals to digital signals by the ADC 33 and the ADC 34 is sufficiently short, the timing signal St maybe a signal indicating output timing of the ADC 33 and the ADC 34.

The transmission data generation unit 54 acquires a time that the clocking unit 53 clocked at a timing indicated by the timing signal St as a capture time tc1 of detection signals from the MR sensor element 24.

In addition, the transmission data generation unit 54 receives the detected angle θc that the rotation angle calculation unit 50 calculated and generates transmission data in which rotation angle data Da indicating the detected angle θc are stored. The transmission data that the transmission data generation unit 54 generated are transmitted to the external measurement device 43 in the calibration device 40 via the communication I/F circuit 36 by the transmission unit 55.

For example, the transmission unit 55 may transmit the transmission data, using a predetermined controller area network (CAN) communication protocol for digital signals. The transmission data generation unit 54 may generate transmission data in a predetermined data format in accordance with the communication protocol.

An example of the data format of the transmission data is illustrated in FIG. 7. Each piece of transmission data has a data format that allows rotation angle data Da and time difference data Dt to be stored in the same frame. In addition, for example, the transmission data may include status information that indicates whether or not the rotation angle data Da are usable data. Note that the status information is not essential.

When a redundant system is configured using a plurality of MR sensor elements, pieces of rotation angle data Da and pieces of time difference data Dt corresponding to the respective MR sensor elements maybe stored in the same frame or may be separately stored in a plurality of frames and transmitted. When a redundant system is configured using a plurality of MR sensor elements, pieces of rotation angle data Da may be transmitted as angular differences with respect to a piece of rotation angle data Da of a preset MR sensor element. For example, in the case of a redundant system composed of three systems, it is assumed that rotation angle data of the first system, rotation angle data of the second system, and rotation angle data of the third system are 100 degrees, 102 degrees, and 99 degrees, respectively. As the rotation angle data of the first system, 100 degrees maybe transmitted, and, as the rotation angle data of the second system and the third system, +2 degrees and −1 degrees, which are differences from the rotation angle data of the first system, may be transmitted as rotation angle data, respectively. This configuration enables transmission data to be compressed.

The time difference data Dt are data relating to a time difference from a capture time tc1 at which detection signals are captured from the MR sensor element 24 until transmission data are transmitted.

A point of time at which the transmission data generation unit 54 stores the time difference data Dt in transmission data is a point of time at which the transmission data are transmitted or earlier. Therefore, at a point of time at which the transmission data generation unit 54 generates the transmission data, the transmission data generation unit 54 cannot clock a point of time at which the transmission data are transmitted. Thus, the transmission data generation unit 54 may, for example, generate time difference data Dt indicating a time difference from the capture time tc1 to the completion of generation of transmission data.

Processing time t required for the transmission unit 55 to transmit the transmission data is a known fixed processing time. Therefore, the time difference data Dt with the processing time t added thereto can indirectly represent a time difference from the capture time tc1 until the transmission data are transmitted.

The transmission data generation unit 54 receives the detected angle θc from the rotation angle calculation unit 50 and stores the rotation angle data Da and the status information in transmission data. The transmission data generation unit 54 acquires a time to that the clocking unit 53 clocks, and stores time difference data Dt indicating a time difference td=te-tc in the transmission data and thereby ends the generation of the transmission data.

Note that, when a period of time required to complete the generation of transmission data after the reception of a detected angle θc is a known fixed period, a generation completion time of the transmission data may be predicted by acquiring a time that the clocking unit 53 clocked at a reception timing of the detected angle θc. Alternatively, when a period of time required to complete the generation of transmission data after the storage of the rotation angle data Da and the status information in the transmission data is a known fixed period, a generation completion time of the transmission data may be predicted by acquiring a time that the clocking unit 53 clocked at a storage timing of the data.

When the transmission data in which the rotation angle data Da and the time difference data Dt are stored are generated by the transmission data generation unit 54, the transmission unit 55 outputs the transmission data to the outside in a known processing time t from the generation completion time of the transmission data. For example, the transmission unit 55 transmits the transmission data to the external measurement device 43 in the calibration device 40.

Note that a transmission mode in which the transmission unit 55 transmits the rotation angle data Da and the time difference data Dt is not limited to the above-described mode. The transmission data generation unit 54 may generate time difference data Dt after having transmitted the rotation angle data Da, and the transmission unit 55 may transmit the time difference data Dt after having transmitted the rotation angle data Da. In this case, the transmission data generation unit 54 may acquire a time that the clocking unit 53 clocks at a point of time at which the transmission unit 55 transmits the rotation angle data Da and may generate time difference data Dt that directly represent a time difference from a capture time tc1 at which detection signals were captured from the MR sensor element 24 to the transmission of the rotation angle data Da.

The rotation angle data Da and the time difference data Dt are used for the calibration device 40 to generate calibration data Dc. The control device 30 has a calibration data reception mode of receiving the calibration data Dc as one of the operation modes of the control device 30.

In the calibration data reception mode, the reception unit 56 and the calibration data acquisition unit 57 operate.

The reception unit 56 receives calibration data Dc from the outside. For example, the reception unit 56 receives the calibration data Dc from the external measurement device 43 in the calibration device 40.

The calibration data acquisition unit 57 stores the calibration data Dc that the reception unit 56 has received in the storage device 32.

Next, the calibration device 40 that generates the calibration data Dc will be described. FIG. 1 is now referred to. The calibration device 40 includes a drive motor 41, a rotation angle measurement unit 42, and the external measurement device 43.

A rotation shaft 44 of the drive motor 41 is joined to the rotation shaft 11 of the motor 10 by means of a joining portion 45. The drive motor 41 causes the rotation shaft 11 of the motor 10 to rotate by rotating the rotation shaft 44 and changes the rotation angle θm of the rotation shaft 11 to various angles.

The rotation angle measurement unit 42 generates a reference angle measurement signal Sr for measuring a reference angle θr that serves as a reference for calibration of the rotation angle calculation device (that is, calibration of a detected angle θc). For example, the rotation angle measurement unit 42 generates a signal for measuring a rotation angle of the rotation shaft 44 of the drive motor 41, which is joined to the rotation shaft 11 of the motor 10, as a reference angle measurement signal Sr. The rotation angle measurement unit 42 outputs the reference angle measurement signal Sr to the external measurement device 43.

The rotation angle measurement unit 42 may, for example, be an encoder that outputs pulses the number of which depends on the amount of rotation of the rotation shaft 44, as a reference angle measurement signal Sr. The external measurement device 43 may measure a reference angle θr by counting (accumulating) the number of pulses that the rotation angle measurement unit 42 outputs.

Note that the rotation angle measurement unit 42 is not limited to an encoder and may be a rotation angle measurement device of another type (for example, a rotation angle measurement device that has been calibrated) or the like.

The external measurement device 43 generates calibration data Dc, based on the rotation angle data Da and the time difference data Dt, which are transmitted by the control device 30, and the reference angle measurement signal Sr and transmits the generated calibration data Dc to the control device 30.

The external measurement device 43 includes a processor 46 that is a CPU, an MPU, or the like, a storage device 47 that is a memory or the like, a communication I/F circuit 48, and an interface circuit (I/F) 49.

The external measurement device 43 receives the rotation angle data Da and the time difference data Dt from the control device 30 via the communication I/F circuit 48. In addition, the external measurement device 43 transmits the calibration data Dc to the control device 30 via the communication I/F circuit 48.

The external measurement device 43 receives the reference angle measurement signal Sr from the rotation angle measurement unit 42 via the I/F 49.

Functions of the external measurement device 43 that will be described below are achieved by, for example, the processor 46 executing computer programs stored in the storage device 47.

The external measurement device 43 may be formed using dedicated hardware for performing respective parts of information processing, which will be described below, in addition to or in place of the processor 46.

For example, the external measurement device 43 may include functional logic circuits that are set in a general-purpose semiconductor integrated circuit. For example, the external measurement device 43 may include a PLD, such as an FPGA.

Figure 8:
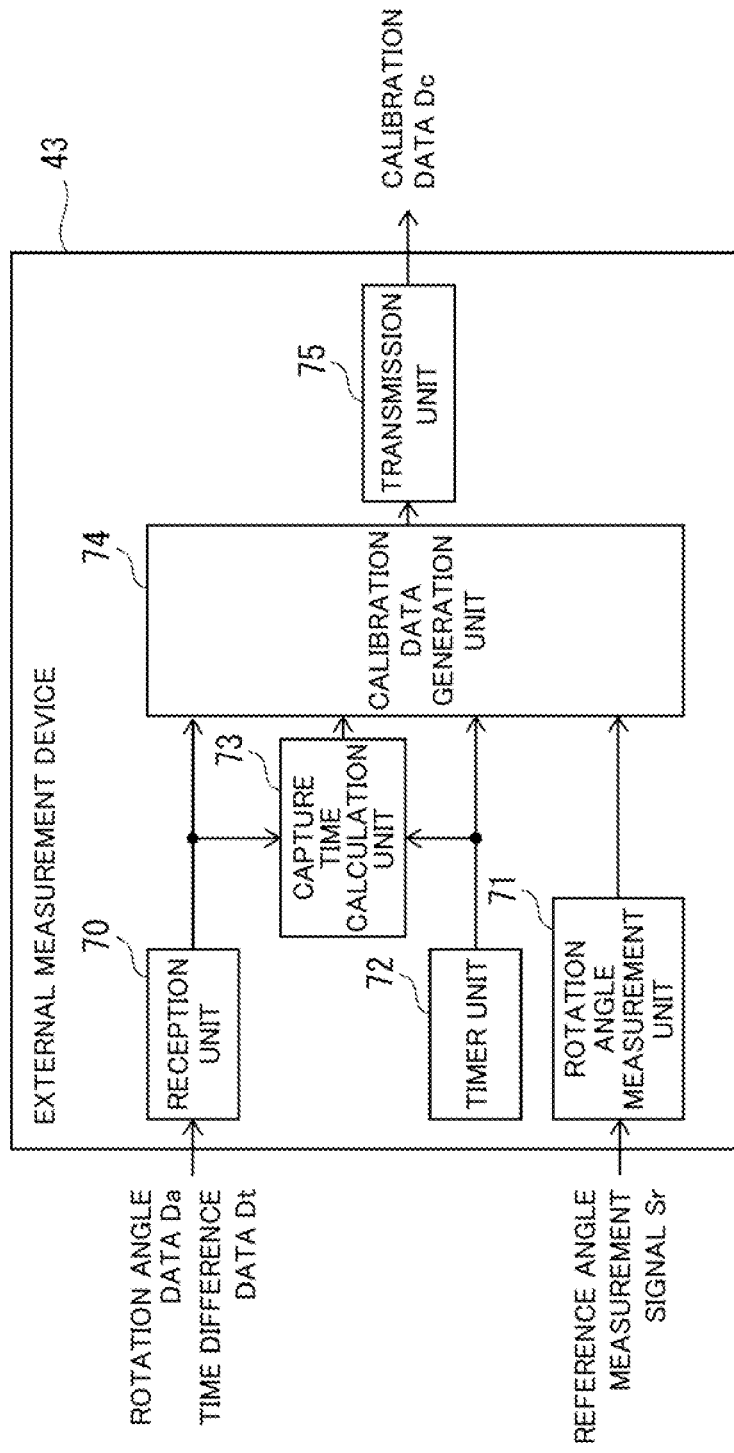
FIG. 8 is an explanatory diagram of an example of a functional configuration of an external measurement device in FIG. 1.

With reference to FIG. 8, an example of a functional configuration of the external measurement device 43 will be described. The external measurement device 43 includes a reception unit 70, a rotation angle measurement unit 71, a clocking unit 72, a capture time calculation unit 73, a calibration data generation unit 74, and a transmission unit 75.

The reception unit 70 receives transmission data that are transmitted from the control device 30. The reception unit 70 outputs rotation angle data Da included in the transmission data to the calibration data generation unit 74 and outputs time difference data Dt included in the transmission data to the capture time calculation unit 73.

The rotation angle measurement unit 71 receives the reference angle measurement signal Sr output from the rotation angle measurement unit 42 and measures a reference angle θr, based on the reference angle measurement signal Sr. The rotation angle measurement unit 71 may measure a reference angle θr by counting (accumulating) the number of pulses that are output from the rotation angle measurement unit 71, which is an encoder.

The clocking unit 72 clocks time. For example, the clocking unit 72 may clock an elapsed period from a predetermined point of time or may clock the current time.

Note that the clocking unit 72 in the external measurement device 43 does not necessarily have to be synchronous with the clocking unit 53 in the control device 30. In other words, times that the clocking unit 72 and the clocking unit 53 respectively clock at the same point of time may be different from each other. For example, a time difference between times that the clocking unit 72 and the clocking unit 53 respectively clock at the same point of time may be longer than a period of measurement by the rotation angle measurement unit 71 (for example, an interval between pulses output from the rotation angle measurement unit 71, which is an encoder).

The capture time calculation unit 73, by monitoring a communication line (such as a bus) through which the control device 30 transmits transmission data to the external measurement device 43, performs high-speed monitoring of timing at which the control device 30 transmits transmission data. The capture time calculation unit 73 acquires a time that the clocking unit 72 clocks at a timing at which transmission data are transmitted, as a transmission time tt of the transmission data.

Alternatively, the acquisition time calculation unit 73 may, by performing high-speed monitoring of timing at which the reception unit 70 receives transmission data, acquires a time that the clocking unit 72 clocks at a timing at which transmission data are received, as a transmission time tt of the transmission data.

The capture time calculation unit 73 calculates a time (hereinafter, referred to as "capture time tc2") that would have been acquired if the clocking unit 72 in the external measurement device 43 had clocked a capture time of detection signals from the MR sensor element 24, based on the transmission time tt and the time difference data Dt. In other words, the capture time calculation unit 73 calculates a capture time tc2 of detection signals from the MR sensor element 24 as a time that is clocked by the clocking unit 72.

For example, the capture time calculation unit 73 calculates, as the capture time tc2, a time obtained by going back in time from the transmission time tt by a time difference from the capture time tc1 of detection signals from the MR sensor element 24 until transmission data are transmitted, the time difference being obtainable based on the time difference data Dt.

For example, the capture time calculation unit 73 calculates, as the capture time tc2, a time obtained by going back in time from the transmission time tt by a time length obtained by adding a known processing time t required for the transmission unit 55 to transmit transmission data to a time difference td indicated by the time difference data Dt.

In addition, for example, when, as described above, the time difference data Dt, which directly represents a time difference from the capture time tc1 of detection signals from the MR sensor element 24 until the rotation angle data Da are transmitted, are transmitted after the transmission of the rotation angle data Da, the capture time calculation unit 73 calculates, as the acquisition time tc2, a time obtained by going back in time from the transmission time tt by a time difference indicated by the time difference data Dt.

The calibration data generation unit 74 receives the reference angle θr, which the rotation angle measurement unit 71 outputs. In addition, the calibration data generation unit 74 acquires a time that the clocking unit 72 clocked at a timing at which the reference angle θr was measured, as a measurement time tm of the reference angle θr. For example, the calibration data generation unit 74 acquires a time at which pulses were output from the rotation angle measurement unit 71, which is an encoder, as a measurement time tm. The calibration data generation unit 74 stores the reference angle θr in association with the measurement time tm.

The calibration data generation unit 74 searches stored reference angles θr at respective measurement times tm for a reference angle θr that was measured at the capture time tc2 by comparing the capture time tc2 and the measurement times tm with each other.

In other words, the calibration data generation unit 74 searches for a reference angle θr that is synchronized with detection signals from the MR sensor element 24 captured at the capture time tc2. In other words, the calibration data generation unit 74 searches for a reference angle θr that is synchronized with a detected angle θc indicated by the rotation angle data Da.

Note that the above-described "reference angle θr that was measured at the capture time tc2" maybe a reference angle θr at a measurement time tm closest to the capture time tc2 or a reference angle θr at a measurement time tm within a predetermined allowable time range from the capture time tc2.

The calibration data generation unit 74 calculates a difference (θc-θr) between the detected angle θc, indicated by the rotation angle data Da, and the reference angle θr and generates calibration data Dc by associating the difference (θc-θr) with the detected angle θc. The calibration data generation unit 74 may reconstruct calibration data Dc from a plurality of acquired detected angles θc and a plurality of pieces of calibration data Dc corresponding thereto, using an interpolation method or the like. This configuration enables finer calibration data Dc to be acquired.

Figure 9:
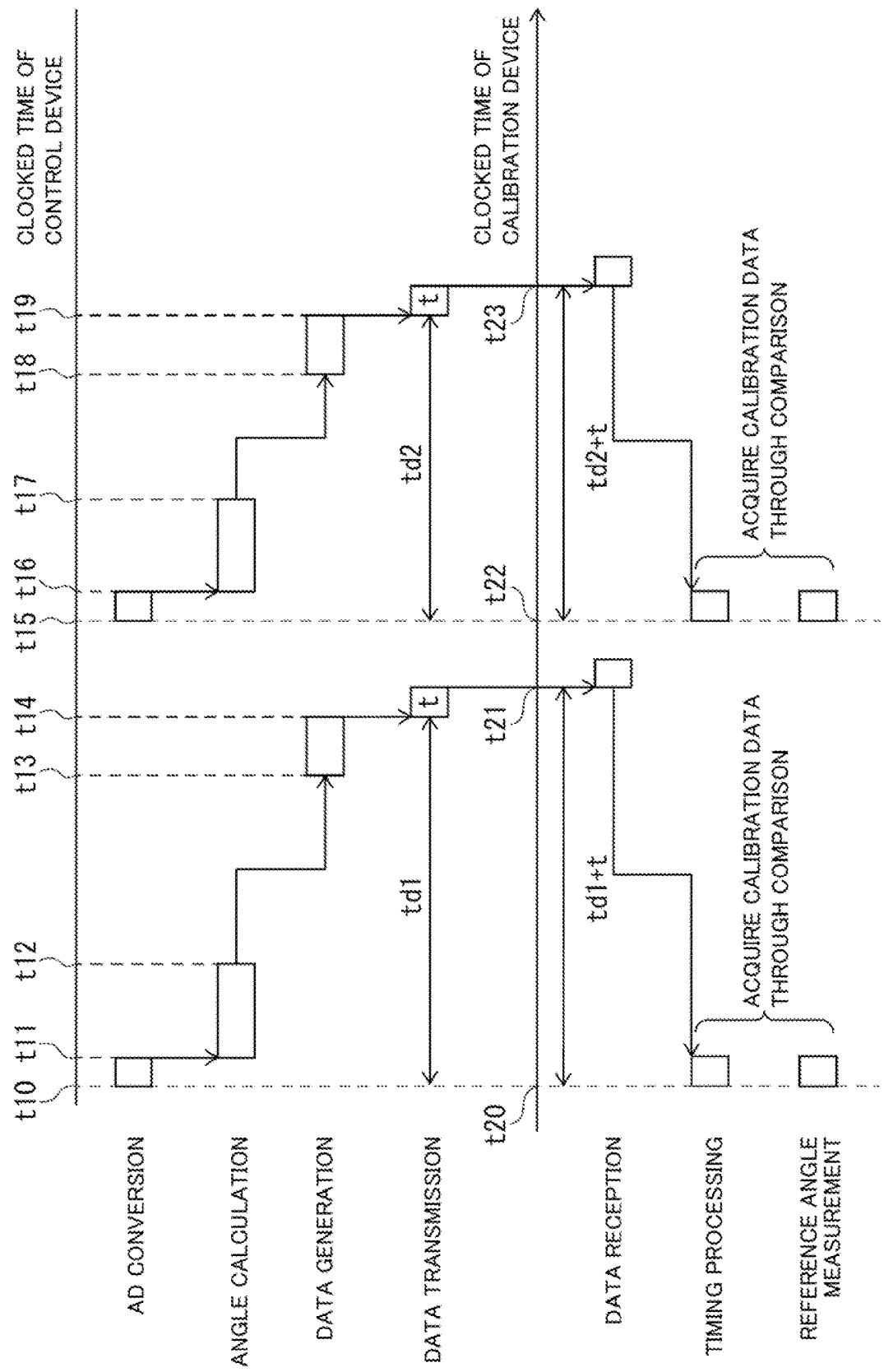
FIG. 9 is a timing diagram illustrative of an example of operation of the control device and the external measurement device.

With reference to FIG. 9, an example of operation of the control device 30 and the external measurement device 43 will be described.

At time t10, the ADC 33 and the ADC 34 start conversion of detection signals (a sine signal SIN and a cosine signal COS) from the MR sensor element 24. The transmission data generation unit 54 in the control device 30 acquires time t10 as a capture time tc1.

Note that times t10 to t19 in FIG. 9 represent times on the time axis that are clocked by the clocking unit 53 in the control device 30. Note also that times t20 to t23 represent times on the time axis that are clocked by the clocking unit 72 in the external measurement device 43.

When the conversion processing by the ADC 33 and the ADC 34 is completed at time t11, the rotation angle calculation unit 50 in the control device 30 starts calculation of a detected angle θc of the rotation angle of the rotation shaft 11 of the motor 10. The calculation of the detected angle θc is completed at time t12.

When the calculation of the detected angle θc is completed, the transmission data generation unit 54 starts generation of transmission data including rotation angle data Da indicating the detected angle θc, time difference data Dt, and status information at subsequent time t13 and completes the generation of the transmission data at time t14. For example, in the transmission data, time difference data Dt indicating a time difference td1=(t14-t10) from the capture time tc1 (t10) to the completion time t14 of the generation of the transmission data are stored.

When the generation of the transmission data is completed at time t14, the transmission unit 55 in the control device 30 transmits the transmission data to the external measurement device 43 in a known processing time t from time t14.

When the transmission data are transmitted from the control device 30, the capture time calculation unit 73 detects the transmission of the transmission data at time t21 that is clocked by the clocking unit 72 in the external measurement device 43 and acquires time t21 as a transmission time tt at which the transmission data were transmitted.

A time at which the processing time t has elapsed since time t14 and time t21 (time tt) are times obtained by the clocking unit 53 in the control device 30 and the clocking unit 72 in the external measurement device 43 having respectively clocked an identical time at which the transmission data were transmitted.

Thus, the capture time calculation unit 73 in the external measurement device 43 calculates time t20 that is obtained by going back in time from the transmission time t21 by a time length (td1+t) obtained by adding the processing time t to a time difference td1 indicated by the time difference data Dt (as illustrated in a row "timing processing" in FIG. 9).

This processing enables the capture time calculation unit 73 to acquire a capture time tc2 (time t20) that would have been acquired if the clocking unit 72 had clocked a capture time of detection signals from the MR sensor element 24.

The calibration data generation unit 74 generates calibration data Dc by associating a difference (θc-θr) between the reference angle θr measured at the capture time tc2 (t20) and the detected angle θc indicated by the rotation angle data Da with the detected angle θc.

Subsequently, the control device 30, as with the operation during a period from time t10 to time t14, converts detection signals from the MR sensor element 24 to digital signals (during a period from time t15 to time t16), calculates a detected angle θc (during a period from time t16 to time t17), generates transmission data (during a period from time t18 to time t19), and transmits the transmission data to the external measurement device 43 (during a period from time t19 to time t19+t).

The external measurement device 43 acquires time t23 as a transmission time tt at which the transmission data are transmitted.

In addition, the external measurement device 43 acquires time t22 that is obtained by going back in time from the transmission time t23 by a time length (td2+t) obtained by adding the processing time t to a time difference td2 indicated by time difference data Dt, as a capture time tc2 that would have been acquired if the clocking unit 72 had clocked a capture time of the detection signals from the MR sensor element 24.

The external measurement device 43 generates calibration data Dc by associating a difference (θc-θr) between a reference angle θr measured at the capture time tc2 (t22) and the detected angle θc indicated by rotation angle data Da with the detected angle θc.

Calculating a capture time tc2 of detection signals from the MR sensor element 24 as a time that is clocked by the clocking unit 72 in the external measurement device 43 as described above enables a reference angle θr that is synchronized with a detected angle θc indicated by rotation angle data Da to be acquired.

This configuration enables a reference angle θr that is synchronized with a detected angle θc indicated by rotation angle data Da to be acquired even when the clocking unit 53 in the control device 30 is asynchronous with the clocking unit 72 in the external measurement device 43.

Note that a time difference (td1+t or td2+t) from a capture time tc1 of detection signals from the MR sensor element 24 until transmission data are transmitted sometimes varies depending on transmission data. For example, in the example illustrated in FIG. 9, the first waiting time (from t12 to t13) after the detected angle θc was calculated until the generation of transmission data is started is longer than the second waiting time (from t17 to t18) because, for example, the control device 30 performs other processing in parallel with the data generation.

As described above, even when a time difference (td1+t or td2+t) varies depending on transmission data, calculating a capture time tc2, based on the time difference data Dt enables synchronization between a detected angle θc indicated by the rotation angle data Da and a reference angle θr to be secured.

As described above, the calibration system 1 of the present embodiment enables synchronization between detection signals from the MR sensor element 24 captured by the control device 30 and a reference angle θr measured by the external measurement device 43, which is a separate entity from the control device 30, to be secured and calibration data Dc of the rotation angle calculation device to be generated according to the detection signals and the reference angle θr.

FIG. 8 is now referred to. The transmission unit 75 in the external measurement device 43 transmits the calibration data Dc that the calibration data generation unit 74 generated to the control device 30.

Note that it is preferable to determine whether or not the detected angle θc corrected using the calibration data Dc falls within a predetermined error range after the calibration data Dc have been transmitted to the control device 30.

For this purpose, the control device 30 may have a second data output mode of outputting a calibrated angle θcc that is obtained by correcting the detected angle θc, based on the calibration data Dc.

In the second data output mode, detection signals are captured from the MR sensor element 24 again, a detected angle θc is calculated by the rotation angle calculation unit 50, and the detected angle θc is corrected based on the calibration data Dc by the correction unit 51 and a calibrated angle θcc is thereby calculated.

The transmission data generation unit 54 generates transmission data in which rotation angle data Da indicating, in place of a detected angle θc before being corrected by the correction unit 51, the calibrated angle θcc are stored.

In other words, the transmission data generation unit 54 generates transmission data including at least the rotation angle data Da indicating the calibrated angle θcc and Dt relating to a time difference from the capture time tc1 at which detection signals were captured from the MR sensor element 24 until the transmission data are transmitted.

When receiving the transmission data including the rotation angle data Da indicating the calibrated angle θcc, the external measurement device 43 calculates a capture time tc2 of detection signals from the MR sensor element 24 as a time that is clocked by the clocking unit 72 in the external measurement device 43, in a similar manner to the processing described above.

The external measurement device 43 calculates an error (θcc-θr) between a reference angle θr measured at the capture time tc2 and the calibrated angle θcc indicated by the rotation angle data Da and, when the error (θcc-θr) does not fall within a predetermined error range, generates calibration data Dc again. When the error ($\theta cc-\theta r$) falls within the predetermined error range, the external measurement device 43 ends the generation of the calibration data Dc.

(Calibration Method for Rotation Angle Calculation Device)

Figure 10:
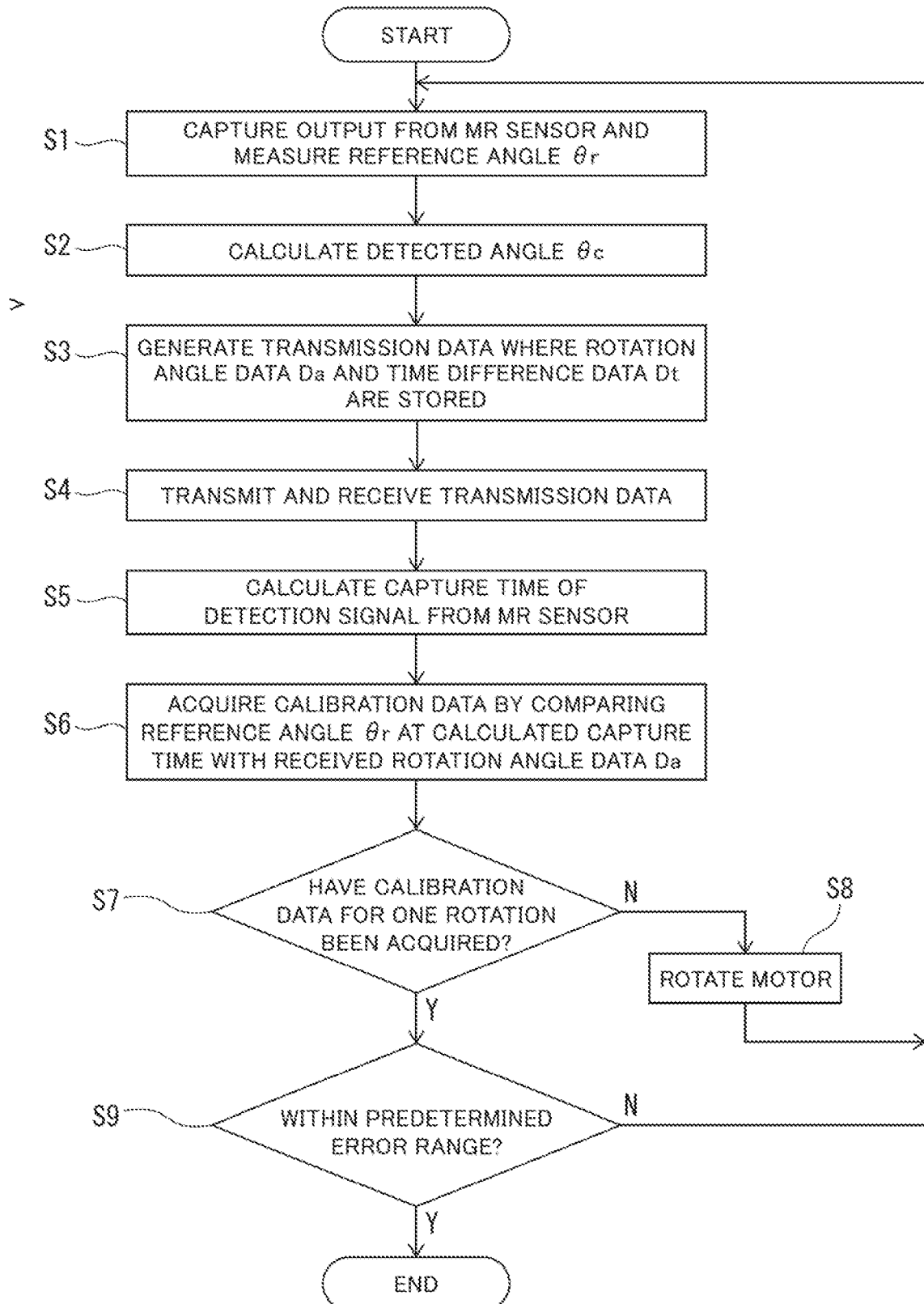
FIG. 10 is a flowchart of an example of a calibration method for the rotation angle calculation device of the embodiment.

Next, with reference to FIG. 10, a calibration method for the rotation angle calculation device of the embodiment will be described.

In step S1, the ADC 33 and the ADC 34 capture detection signals from the MR sensor element 24 into the control device 30 by converting the detection signals to digital signals. The transmission data generation unit 54 in the control device 30 acquires a capture time tc1 of the detection signals from the MR sensor element 24, using the clocking unit 53.

Meanwhile, the rotation angle measurement unit 71 in the external measurement device 43 measures a reference angle $\theta r$. The calibration data generation unit 74 acquires a measurement time tm of the reference angle $\theta r$, using the clocking unit 72.

In step S2, the rotation angle calculation unit 50 in the control device 30 calculates a detected angle $\theta c$ of the rotation angle of the rotation shaft 11 of the motor 10, based on output signals from the ADC 33 and the ADC 34.

In step S3, the transmission data generation unit 54 generates transmission data in which rotation angle data Da indicating the detected angle $\theta c$ and time difference data Dt are stored. As described above, the time difference data Dt are data relating to a time difference from the capture time tc1 until the rotation angle data Da are transmitted.

In step S4, the transmission unit 55 in the control device 30 transmits the transmission data to the external measurement device 43 in the calibration device 40. The reception unit 70 in the external measurement device 43 receives the transmission data.

On this occasion, the capture time calculation unit 73 in the external measurement device 43 acquires a time at which the control device 30 transmits the transmission data or a time at which the reception unit 70 receives the transmission data, using the clocking unit 72 as a transmission time tt of the transmission data.

In step S5, the capture time calculation unit 73 calculates a capture time tc2 at which the control device 30 captured the detection signals from the MR sensor element 24, based on the transmission time tt and the time difference data Dt, as a time that is clocked by the clocking unit 72.

In step S6, the calibration data generation unit 74 generates calibration data Dc by comparing the reference angle $\theta r$ measured at the capture time tc2 and the detected angle $\theta c$ indicated by the rotation angle data Da with each other.

In step S7, the calibration data generation unit 74 determines whether or not calibration data Dc for one rotation of the rotation shaft 11 of the motor 10 have been acquired. When calibration data Dc for one rotation have not been acquired yet (step S7: N), the process proceeds to step S8. When calibration data Dc for one rotation have been acquired (step S7: Y), the process proceeds to step S9.

In step S8, the rotation angle $\theta m$ of the rotation shaft 11 of the motor 10 is changed by causing the drive motor 41 to rotate. Subsequently, the process returns to step S1.

In step S9, whether or not values obtained by correcting detected angles $\theta c$ calculated by the rotation angle calculation unit 50, using the calibration data Dc generated in steps S1 to S8 fall within a predetermined error range is determined.

Specifically, the operation mode of the control device 30 is switched to the second data output mode, and calibrated angles $\theta cc$ that are obtained by correcting detected angles $\theta c$, based on the calibration data Dc are transmitted from the control device 30 to the external measurement device 43.

The external measurement device 43 calculates errors ($\theta cc-\theta r$) between the reference angles $\theta r$ and the calibrated angles $\theta cc$ and determines whether or not the errors ($\theta cc-\theta r$) fall within a predetermined error range across the rotation angle range of the rotation shaft 11.

When an error ($\theta cc-\theta r$) does not fall within the predetermined error range (step S9: N), the process returns to step S1 and the calibration data Dc are generated again. When the errors ($\theta cc-\theta r$) fall within the predetermined error range (step S9: Y), the process terminates.

Although, in step S7, whether or not calibration data Dc for one rotation are acquired is determined, it may be configured such that calibration data Dc for one period or more are acquired. In this case, a plurality of pieces of calibration data Dc acquired for each detected angle $\theta c$ may be averaged and the averaged values may be used as calibration data Dc. This configuration enables noise to be reduced.

(Application of Rotation Angle Sensor)

Figure 11:
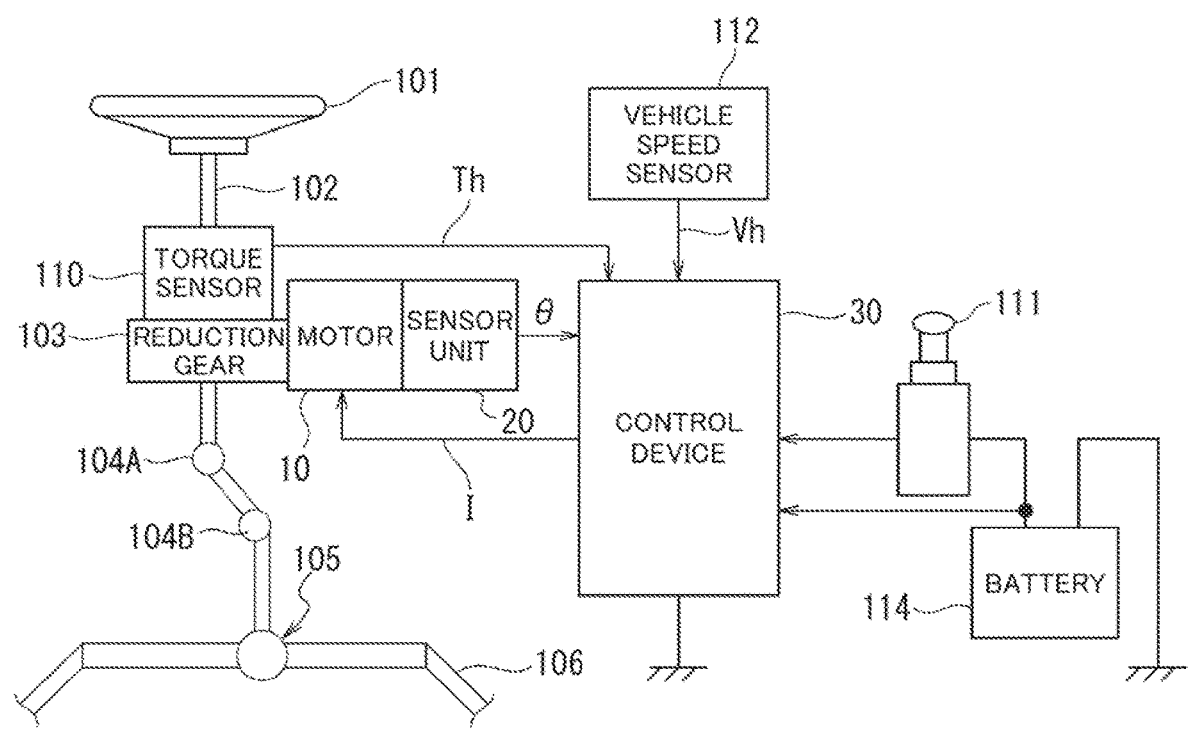
FIG. 11 is a configuration diagram illustrative of an overview of an example of an electric power steering device including the rotation angle calculation device of the embodiment.

Next, with reference to FIG. 11, a configuration example in a case where the rotation angle calculation device of the present embodiment is applied to an electric power steering device that controls steering assist force provided to the steering system of a vehicle will be described.

A column shaft 102 of a steering wheel 101 is connected to tie rods 106 of steered wheels via a reduction gear 103, universal joints 104A and 104B, and a pinion rack mechanism 105. To the column shaft 102, a torque sensor 110 that detects steering torque Th of the steering wheel 101 is disposed, and the motor 10 that assists steering force of the steering wheel 101 is connected to the column shaft 102 via the reduction gear 103.

The above-described control device 30 is used as an electronic control unit that controls the power steering device. To the control device 30, power is supplied from a battery 114 that is a power source and an ignition key signal is also input from an ignition key 111.

The control device 30 calculates a steering angle $\theta$ of the steering wheel 101, based on the rotation angle $\theta m$ of the motor 10 that is calculated as described above and a reduction ratio N of the reduction gear 103. The control device 30 performs calculation of a steering assist command value of an assist command, using an assist map or the like, based on the steering angle $\theta$, the steering torque Th, vehicle speed Vh that is detected by a vehicle speed sensor 112 and controls current I that is supplied to the motor 10, based on the calculated steering assist command value.

In the electric power steering device having such a configuration, the steering torque Th that is generated by steering operation by the driver and transmitted from the steering wheel 101 is detected by the torque sensor 110, a steering angle $\theta$ is calculated based on the rotation angle $\theta m$ of the motor 10, the motor 10 is drive-controlled by a steering assist command value calculated based on the steering torque Th, the steering angle $\theta$, and the vehicle speed Vh, and this drive is provided to the steering system as an assist force (steering assist force) for the steering operation by the driver.

(Advantageous Effects of Embodiment)

(1) The calibration system. 1 includes the rotation angle calculation device configured to calculate a rotation angle of a rotating body, based on detection signals output from the MR sensor element 24 depending on rotation of the rotating body and the calibration device 40 for calibrating the rotation angle calculation device. The rotation angle calculation device includes the sensor unit 20 in which the MR sensor element 24 is mounted and the control device 30.

The control device 30 calculates a rotation angle of the rotating body, based on detection signals from the MR sensor element 24 and transmits rotation angle data Da indicating the rotation angle from the control device 30 to the calibration device 40.

In addition, the control device 30 transmits time difference data Dt relating to a time difference after having captured detection signals from the MR sensor element 24 until transmitting the rotation angle data Da from the control device 30 to the calibration device 40.

The calibration device 40 measures a rotation angle θr of the rotating body and clocks a measurement time tm at which the rotation angle θr is measured and a transmission time tt at which the rotation angle data Da are transmitted or received.

The calibration device 40 acquires calibration data Dc of the rotation angle data Da by comparing the rotation angle θr that the calibration device 40 measured at a time tc2 obtained by going back in time from the transmission time tt by a time difference after having captured detection signals from the MR sensor element 24 until transmitting the rotation angle data Da and the rotation angle data Da with each other.

This configuration enables, with synchronization secured between a rotation angle calculated by the rotation angle calculation device and a rotation angle measured by the calibration device 40, which is separate from the rotation angle calculation device, calibration data for the rotation angle calculation device to be generated.

For example, even when the clocking unit 53 in the rotation angle calculation device is asynchronous with the clocking unit 72 in the calibration device 40, it is possible to secure synchronization between a rotation angle calculated by the rotation angle calculation device and a rotation angle measured by the calibration device 40, which is separate from the rotation angle calculation device.

(2) The control device 30 transmits transmission data in which the rotation angle data Da and the time difference data Dt are stored in the same frame to the calibration device 40. This configuration enables overheads of communication to be reduced compared with a case where the rotation angle data Da and the time difference data Dt are, while stored in separate frames, transmitted. Since, as a result, it is possible to increase a transmission frequency of the rotation angle data Da, it is possible to reduce time required for calibration processing.

(3) The control device 30, after having generated transmission data in which the rotation angle data Da are stored and that are to be transmitted to the calibration device 40, transmits the transmission data to the calibration device 40 in a known processing time t. The control device 30 generates time difference data Dt indicating a time difference after having captured detection signals from the MR sensor element 24 until completing generation of transmission data.

Because of this configuration, adding a known processing time t to a time difference indicated by the time difference data Dt enables a time length after detection signals were acquired from the MR sensor element 24 until the transmission data are transmitted to be indirectly represented. As a result, it is possible to store information on a time difference until the transmission data are transmitted in the transmission data.

(4) The calibration device 40 causes the drive motor 41 to rotate a rotating body and acquires calibration data Dc at a plurality of rotation angles of the rotating body.

This configuration enables calibration data Dc at a plurality of different rotation angles of the rotating body to be generated.

REFERENCE SIGNS LIST

1 Calibration system
10 Motor
11 Rotation shaft
12 Output end
14 End
20 Sensor unit
21 Magnet
22 Circuit board
23 Support member
24 MR sensor element
25 Harness
30 Control device
31 Processor
32 Storage device
33, 34 Analog-digital converter (ADC)
35 Drive circuit
36 Communication I/F circuit
40 Calibration device
41 Drive motor
42 Rotation angle measurement unit
43 External measurement device
44 Rotation shaft
45 Joining portion
46 Processor
47 Storage device
48 Communication I/F circuit
49 I/F
50 Rotation angle calculation unit
51 Correction unit
52 Driving signal generation unit
53 Clocking unit
54 Transmission data generation unit
55 Transmission unit
56 Reception unit
57 Calibration data acquisition unit
60 Adder
61 Subtracter
62 Calculation unit
70 Reception unit
71 Rotation angle measurement unit
72 Clocking unit
73 Capture time calculation unit
74 Calibration data generation unit
75 Transmission unit
101 Steering wheel
102 Column shaft
103 Reduction gear
104A, 104B Universal joint
105 Pinion rack mechanism
106 Tie rod
110 Torque sensor
111 Ignition key
112 Vehicle speed sensor
114 Battery

The invention claimed is:

1. A rotation angle calculation device comprising:
a sensor configured to output a detection signal depending on rotation of a rotating body;

a rotation angle calculation unit configured to calculate a rotation angle of the rotating body, based on the detection signal;

a reception unit configured to receive calibration data for calibration of a rotation angle of the rotating body calculated by the rotation angle calculation unit;

a storage unit configured to store the received calibration data;

a correction unit configured to correct a rotation angle of the rotating body calculated by the rotation angle calculation unit with the calibration data stored in the storage unit; and a transmission unit configured to transmit rotation angle data indicating the rotation angle calculated by the rotation angle calculation unit and not corrected by the correction unit and to also transmit time difference data relating to a time difference after having captured the detection signal from the sensor until transmitting the rotation angle data.

2. A motor control device comprising:

the rotation angle calculation device according to claim 1 configured to calculate a rotation angle of a rotation shaft of a motor as the rotating body; and a driving unit configured to drive the motor according to a rotation angle of the rotating shaft corrected by the correction unit.

3. An electric actuator product comprising:

the motor control device according to claim 2; and a motor controlled by the motor control device.

4. An electric power steering device comprising:

the motor control device according to claim 2; and a motor controlled by the motor control device, wherein a steering assist force is provided to a steering system of a vehicle by the motor.

* * * * *